United States Patent [19]

Chang

[11] Patent Number: 5,456,637
[45] Date of Patent: Oct. 10, 1995

[54] CHAIN SHIFTING DEVICE FOR BICYCLE

[76] Inventor: Shu-gen Chang, No. 198 Jen-shing Rd., Heng-shan Village, Da-ya Hsiang, Taichung Hsien, Taiwan

[21] Appl. No.: 319,586

[22] Filed: Oct. 7, 1994

[51] Int. Cl.⁶ .................................................. F16H 9/00
[52] U.S. Cl. ........................................................ 474/78
[58] Field of Search ........................... 474/78–81, 69–70

[56]  References Cited

U.S. PATENT DOCUMENTS

| | | | |
|---|---|---|---|
| 4,601,682 | 7/1986 | Nagano | 474/78 X |
| 4,627,827 | 12/1986 | Juy | 474/80 |
| 4,824,420 | 4/1989 | Romano | 474/78 |

*Primary Examiner*—Michael Powell Buiz
*Attorney, Agent, or Firm*—Morton J. Rosenberg; David I. Klein

[57]  ABSTRACT

A chain shifting device for bicycle includes a body having a connector and a coupler pivotally coupled to the upper and lower portion. The clutch cable is threaded through the connector and is secured to the coupler. A frame is secured to the coupler for supporting chain tension pulley and chain guide pulley. The frame is moved by the clutch cable in order to shift the chain to engage with either of the rear sprocket wheels so as to change the bicycle speed. Two positioning screws are secured to the block for engaging with the connector and the coupler and for limiting movement of the frame.

1 Claim, 5 Drawing Sheets

CHAIN SHIFTING DEVICE FOR BICYCLE

BACKGROUND OF THE INVENTION

1. Field of the Invention

The present invention relates to a chain shifting device, and more particularly to a chain shifting device or a derailleur for bicycles.

2. Description of the Prior Art

Typical chain shifting devices or derailleurs are provided for stretching an endless driving chain and for shifting the chain to engage with either of a plurality of rear sprocket wheels so as to change speed of the bicycles. However, typical derailleurs comprise a rather complicated configuration that is adverse for manufacturing purposes and comprise a large volume that is adverse for packaging purposes and adverse for transportation purposes.

The present invention has arisen to mitigate and/or obviate the afore-described disadvantages of the conventional derailleurs for bicycles.

SUMMARY OF THE INVENTION

The primary objective of the present invention is to provide a chain shifting device for a bicycle which includes a greatly simplified configuration for facilitating manufacturing thereof and which occupies a small volume for facilitating transportation and packaging effects thereof.

In accordance with one aspect of the invention, there is provided a chain shifting device for bicycle comprising a body including an upper portion and a lower portion, and a block secured thereto, two positioning members secured to the block, a connector pivotally secured to the upper portion of the body and including a flange laterally extended therefrom and a protrusion extended therefrom for engaging with one of the positioning screws, a threading means secured to the flange for threading a clutch cable, a coupler pivotally secured to the lower portion of the body and including an ear extended therefrom and a projection extended therefrom for engaging with the other positioning screw, a fastening means secured to the ear for fixing the clutch cable in place, and a frame secured to the coupler for supporting chain tension pulley and chain guide pulley. The coupler and the frame are caused to rotate about the connector when the clutch cable is pulled. The positioning screws are engaged with the protrusion and the projection for limiting movement of the frame.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
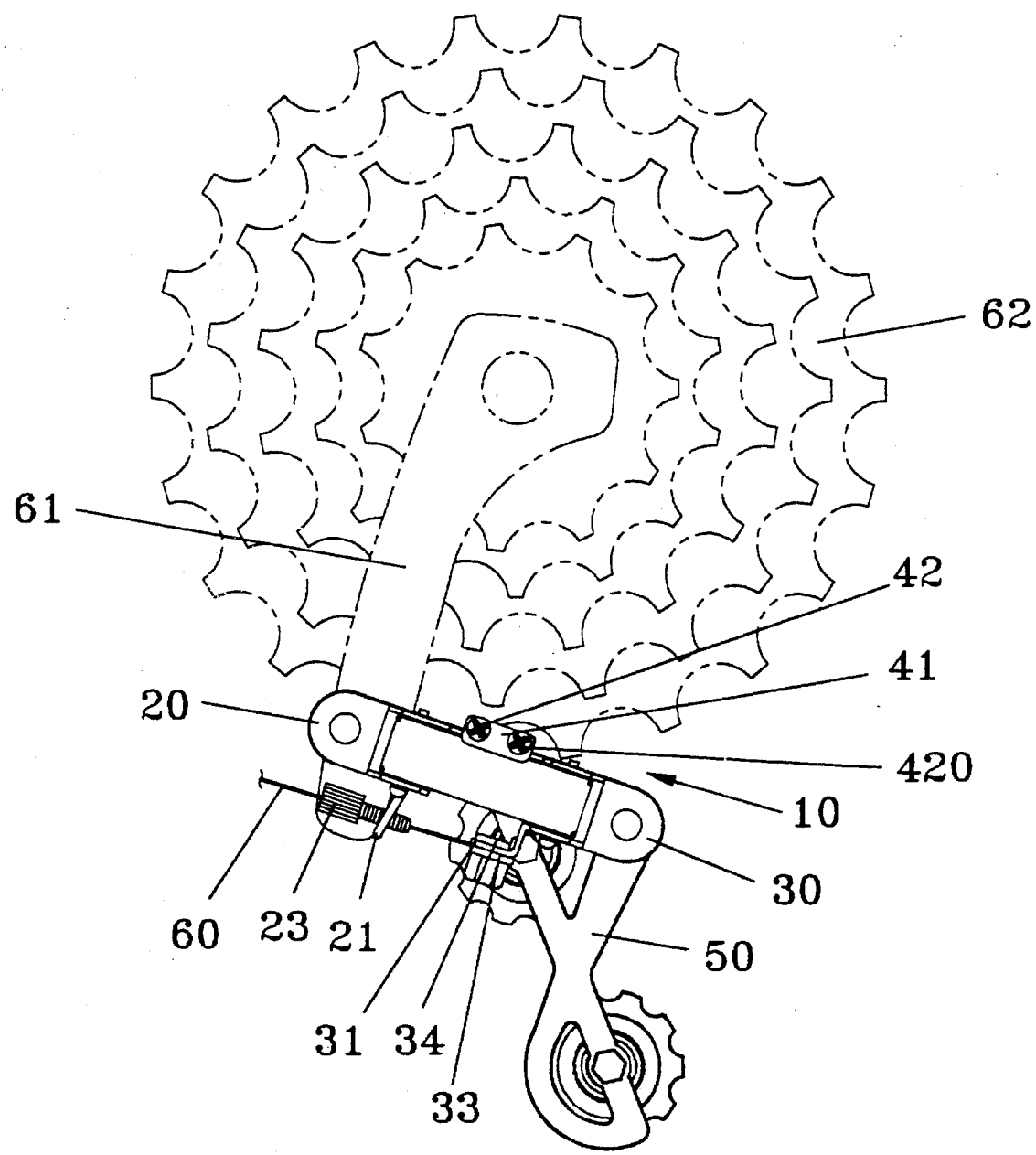
FIG. 1 is a plane view illustrating an application of a chain shifting device in accordance with the present invention to the bicycle.

Referring to the drawings, and initially to FIGS. 1 to 3, a chain shifting device in accordance with the present invention is generally indicated by the reference numeral "10" and is secured to a beam which is secured to the bicycle frame, and is disposed below the rear sprocket wheels 62 for shifting the chain to engage with either of the rear sprocket wheels so as to change speed of-the bicycles.

The chain shifting device comprises a body 40 including two boards disposed in parallel with each other, one of the boards 40 includes a block secured thereto for engaging with two positioning screws 42, 420. A connector 20 is pivotally coupled to the upper portion of the body 40 and includes a flange 42 laterally extended therefrom for engaging with a bolt 23 which includes a bore 230 for threading a clutch cable 60 (FIG. 1). The connector 20 includes protrusion 22 for engaging with the positioning screw 42. A coupler 30 is pivotally coupled to the lower portion of the body 40 and includes an ear 31 extended therefrom for engaging with a bolt 33 and a fastener 34 so as to fix the free end portion of the clutch cable 60 in place (FIG. 1). The coupler 30 includes a projection 32 for engaging with the other positioning screw 420 and includes a hole 35 formed therein. A frame 50 includes a shaft 51 extended therefrom for engaging with the hole 35 of the coupler 30 and for securing to the coupler 30. The frame 50 is provided for supporting a chain tension pulley and a chain guide pulley.

Figure 2:
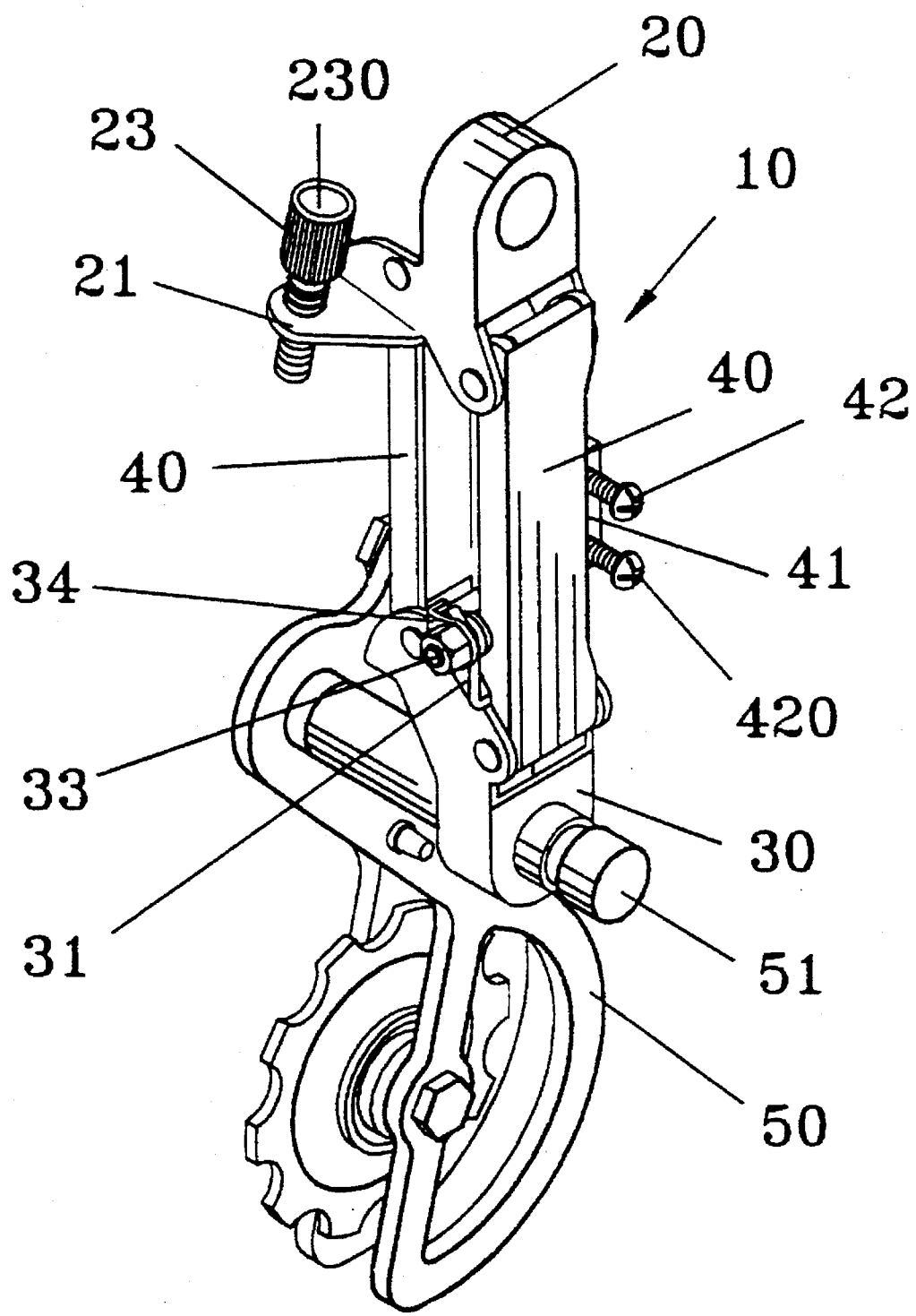
FIG. 2 is a perspective view of the chain shifting device.
Figure 3:
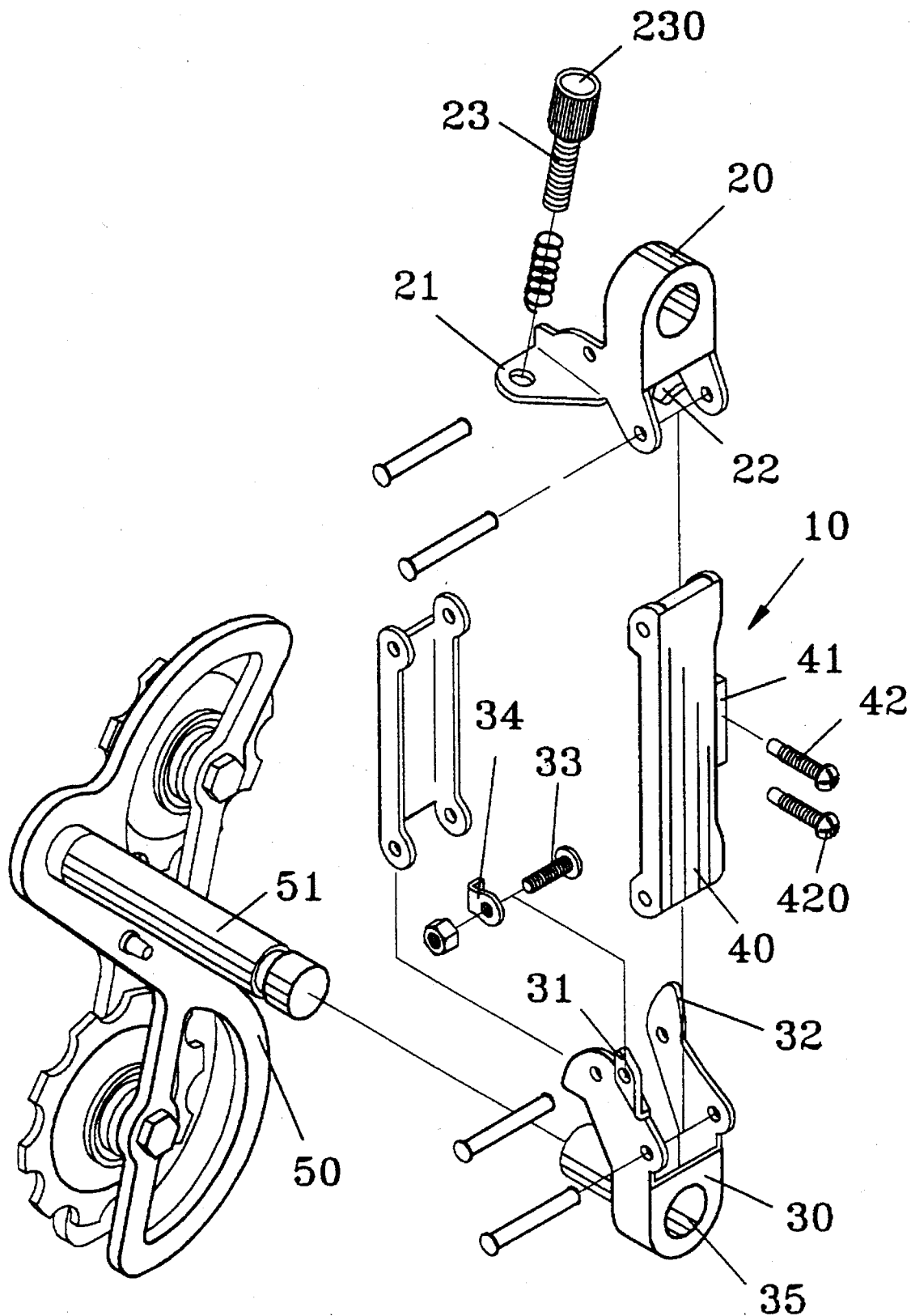
FIG. 3 is an exploded view of the chain shifting device.

As shown in FIGS. 1 and 2, the cable threading bolt 23 and the fastener 34 for fixing the clutch cable 60 are arranged such that the coupler 30 can be caused to rotate relative to the connector 20 when the clutch cable 60 is pulled, so as to move the frame 50 laterally along the longitudinal direction of the shaft 51 (FIGS. 4 and 5) and so as to move the chain to engage with either of the rear sprocket wheels.

Figure 4:
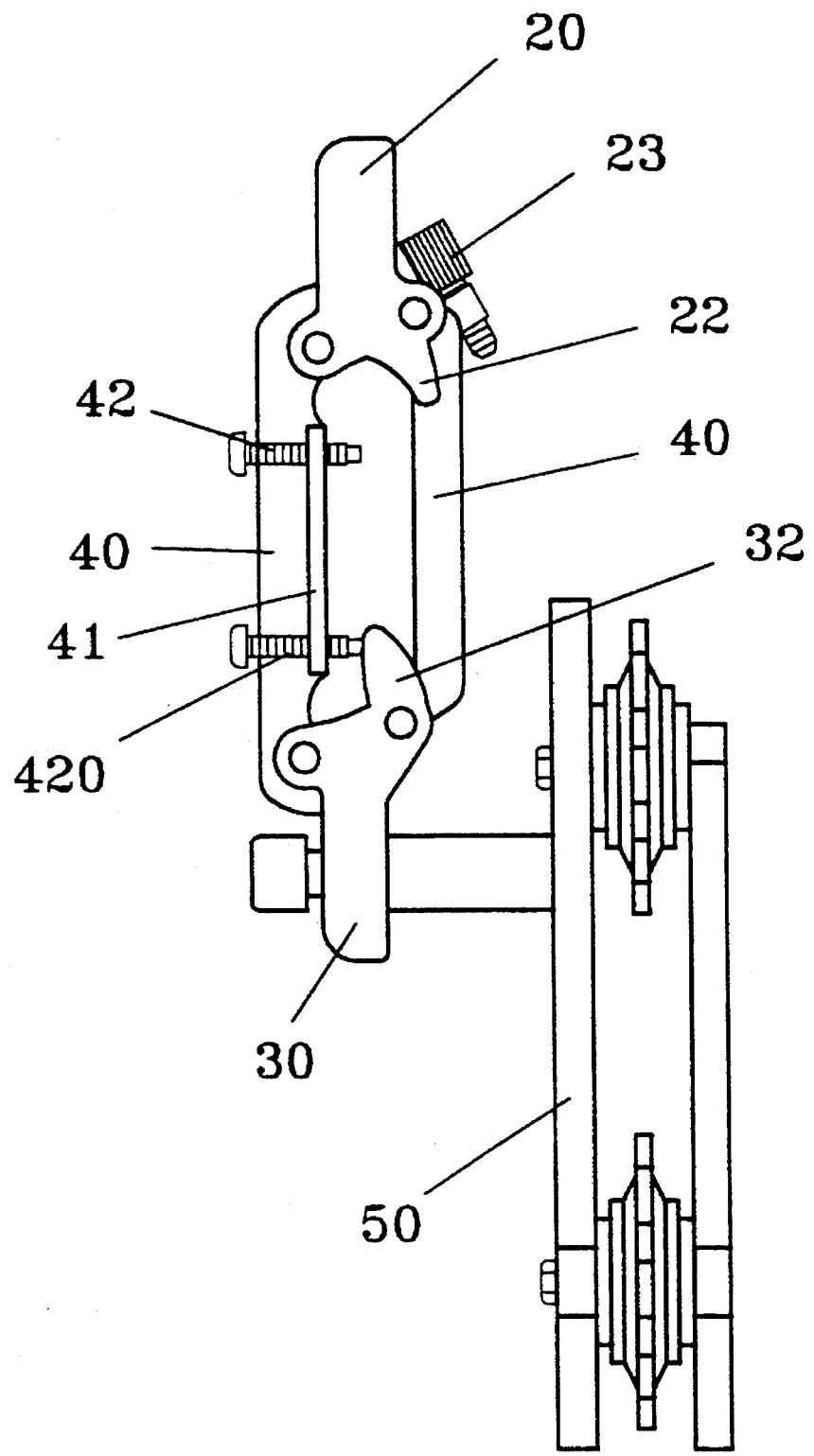
FIGS. 4 and 5 are schematic views illustrating the operation of the chain shifting device.
Figure 5:
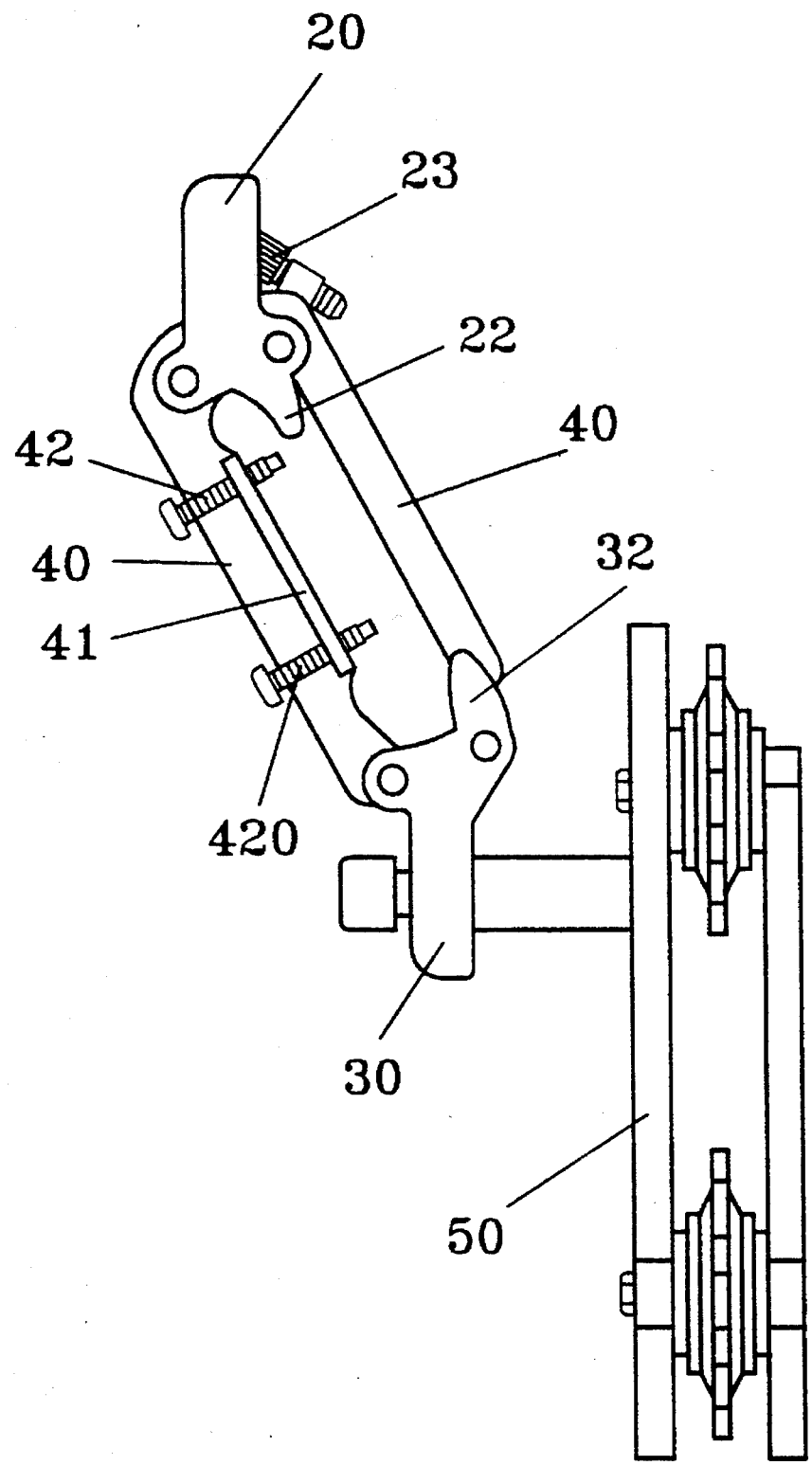

Referring next to FIGS. 4 and 5, the positioning screws 42, 420 may engage with the protrusion 22 and the projection 32 respectively so as to limit the movement of the frame 50 and so as to prevent the chain from disengaging from the rear sprocket wheels.

It is to be preferable that the block 41 is disposed distal to the clutch cable so as to prevent the positioning screws 42, 420 from engaging with the clutch cable. The flange 21 is integrally secured to the connector 20 and includes a small volume, and the ear 31 of the coupler 30 also includes a small volume such that the whole chain shifting device includes a greatly decreased volume.

Accordingly, the chain shifting device for a bicycle in accordance with the present invention includes a greatly simplified configuration for facilitating manufacturing thereof and occupies a small volume for facilitating transportation and packaging effects thereof.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A chain shifting device for bicycle comprising:

a body including an upper portion and a lower portion, and a block secured thereto, two positioning members secured to said block, a connector pivotally secured to said upper portion of said body and including a flange laterally extended therefrom and a protrusion extended therefrom for engaging with a first of said positioning screws, a threading means secured to said flange for threading a clutch cable, a coupler pivotally secured to said lower portion of said body and including an ear extended therefrom and a projection extended therefrom for engaging with a second of said positioning screws, a fastening means secured to said ear for fixing said clutch cable in place, and a frame secured to said coupler for supporting chain tension pulley and chain guide pulley, said coupler and said frame being caused to rotate about said connector when said clutch cable is pulled, and said positioning screws being engaged with said protrusion and said projection for limiting movement of said frame.

* * * * *